United States Patent
Porte et al.

(10) Patent No.: US 11,066,994 B2
(45) Date of Patent: Jul. 20, 2021

(54) ASSEMBLY COMPRISING TWO JUXTAPOSED ACOUSTIC PANELS IN WHICH THE PANELS COMPRISE A RESISTIVE FACE WHICH EXTENDS AS FAR AS AN END WALL

(71) Applicant: Airbus Operations (S.A.S.), Toulouse (FR)

(72) Inventors: Alain Porte, Colomiers (FR); Jacques Lalane, Saint Orens de Gameville (FR); François Pons, Daux (FR)

(73) Assignee: Airbus Operations (S.A.S.), Toulouse (FR)

( * ) Notice: Subject to any disclaimer, the term of this patent is extended or adjusted under 35 U.S.C. 154(b) by 82 days.

(21) Appl. No.: 16/586,075

(22) Filed: Sep. 27, 2019

(65) Prior Publication Data
US 2020/0102890 A1 Apr. 2, 2020

(30) Foreign Application Priority Data

Sep. 28, 2018 (FR) ...................................... 1858975

(51) Int. Cl.
*F02C 7/045* (2006.01)
*B64D 33/02* (2006.01)
*G10K 11/16* (2006.01)

(52) U.S. Cl.
CPC ............ *F02C 7/045* (2013.01); *G10K 11/161* (2013.01); *B64D 2033/0206* (2013.01);
(Continued)

(58) Field of Classification Search
CPC ... F02C 7/045; F02C 7/24; F02K 1/87; B64D 2033/0206; G10K 11/161; G10K 11/162; F05D 2250/75
See application file for complete search history.

(56) References Cited

U.S. PATENT DOCUMENTS

| 6,123,170 A | * | 9/2000 | Porte | F01D 25/243 |
| | | | | 181/214 |
| 6,857,669 B2 | * | 2/2005 | Porte | F01D 25/243 |
| | | | | 285/368 |

(Continued)

FOREIGN PATENT DOCUMENTS

| DE | 10312833 A1 | * | 3/2004 | ............ E04F 13/144 |
| EP | 3 309 075 A1 | | 4/2018 | |

(Continued)

OTHER PUBLICATIONS

French Search Report for Application No. 1858975 dated Jul. 1, 2019.

*Primary Examiner* — Igor Kershteyn
*Assistant Examiner* — Topaz L. Elliott
(74) *Attorney, Agent, or Firm* — Jenkins, Wilson, Taylor & Hunt, P.A.

(57) ABSTRACT

An assembly including two juxtaposed acoustic panels. Resistive faces of the acoustic panels are in the continuation of one another. A first resistive face extends as far as the first end wall of a first panel. The first end wall is in contact with a second end wall of a second panel in the region of the first resistive face and of the second resistive face. A connecting piece is interposed between the first end wall and the second end wall over a part of the length thereof so that the connecting piece does not extend as far as the first and second resistive faces. That makes it possible to form an acoustic cladding that is continuous, exhibiting no non-acoustic zone or reduced-acoustic zone at the junction between the acoustic panels of which it is formed. A nacelle of an aircraft propulsion unit is one application.

9 Claims, 5 Drawing Sheets

(52) U.S. Cl.
CPC ...... *F05D 2240/91* (2013.01); *F05D 2250/75* (2013.01); *F05D 2260/96* (2013.01)

(56) References Cited

U.S. PATENT DOCUMENTS

| | | | | |
|---|---|---|---|---|
| 6,871,725 | B2* | 3/2005 | Johnson | F02C 7/045 |
| | | | | 181/292 |
| 7,328,771 | B2* | 2/2008 | Costa | B64D 33/02 |
| | | | | 181/214 |
| 7,866,440 | B2* | 1/2011 | Douglas | B64D 33/02 |
| | | | | 181/213 |
| 8,056,294 | B2* | 11/2011 | LaLonde | E04B 9/28 |
| | | | | 52/506.09 |
| 8,197,191 | B2* | 6/2012 | Binks | B64D 33/02 |
| | | | | 415/119 |
| 2004/0007422 | A1* | 1/2004 | Porte | F01D 25/243 |
| | | | | 181/210 |
| 2004/0094359 | A1 | 5/2004 | Porte et al. | |
| 2008/0017442 | A1* | 1/2008 | Douglas | B64D 33/02 |
| | | | | 181/213 |
| 2010/0000227 | A1* | 1/2010 | Porte | B64D 33/02 |
| | | | | 60/796 |
| 2016/0032834 | A1 | 2/2016 | Plante et al. | |

FOREIGN PATENT DOCUMENTS

| | | | |
|---|---|---|---|
| FR | 2 978 731 A1 | 2/2013 | |
| KR | 20150065290 A1 * | 6/2015 | ............ B64D 29/00 |

* cited by examiner

US 11,066,994 B2

ASSEMBLY COMPRISING TWO JUXTAPOSED ACOUSTIC PANELS IN WHICH THE PANELS COMPRISE A RESISTIVE FACE WHICH EXTENDS AS FAR AS AN END WALL

CROSS-REFERENCE TO RELATED APPLICATION

This application claims priority to French Patent Application No. 1858975, filed Sep. 28, 2018, the entire disclosure of which is incorporated by reference herein.

TECHNICAL FIELD

The disclosure herein relates to the field of acoustic panels, namely of structures designed to absorb sound waves. It relates more particularly to the junction between two acoustic panels.

BACKGROUND

Acoustic claddings or panels are used in numerous technical fields, notably in the field of aeronautics. They generally comprise a cellular structure made up of pockets or cells, namely juxtaposed hollow individual volumes. These panels, comprising a cellular structure having cells that open onto one face, or at the very least cells that communicate with the outside of the panel, are used for their soundproofing properties.

They may be made of various materials, for example plastics, composite or metallic materials. The cells of the acoustic panels may have various geometries. One well known shape of cellular structure has cells in the shape of hexagon-base right prisms. The term "honeycomb" is often used to refer to this type of structure with hexagonal cells, although this same expression is also used, as an accepted misnomer, to refer to cellular panels having cells of other shapes.

Thus, a conventional acoustic cladding or panel generally comprises a honeycomb core interposed between a perforated sheet that forms a first face and a solid sheet referred to as the back skin that closes off the cells, forming a second face of the cladding and generally affording it greater rigidity.

The disclosure herein relates to the junction between two acoustic panels when two panels need to be juxtaposed with one another in order to form an acoustic-treatment surface. This may occur when it is more economical, or technically simpler, to join two (or more) panels than to form a treatment surface using one single acoustic panel.

One example via which the disclosure herein will be illustrated hereinafter is the junction between a front part and a main part of a nacelle of an aircraft propulsion unit.

An aircraft propulsion assembly is depicted by way of example in FIG. 1a. A nacelle N of an aircraft propulsion assembly conventionally comprises an anterior part P1 that forms the air intake. The anterior part P1 is intended to collect the air so as to ensure uniform flow toward the fan. The nacelle also comprises a main part P2 constituting the rest of the nacelle.

One example of a conventional installation of a nacelle N on an aircraft A is depicted in FIG. 1b. Acoustic panels are used to form, at least in part, the interior surface of the nacelle. The purpose of these panels is to limit the noise emissions of the propulsion unit by absorbing the sound waves generated particularly by the engine and the fan.

Now, a first acoustic panel is situated to the rear of the anterior part P1, and a second acoustic panel is situated in front of the main part P2. An example of a connection achieved in the prior art between the anterior part P1 and the main part P2 in the region of the first acoustic panel 1 and of the second acoustic panel 2 is depicted in FIG. 2.

The first acoustic panel 1 comprises a first resistive face 11. The second acoustic panel 2 comprises a second resistive face 21. The resistive face of an acoustic panel makes it possible to lessen the disturbances of the noise, and is made up of one or more porous layers (for example a perforated plate).

The first acoustic panel 1 is connected to the second acoustic panel 2 by a set of connections performed from the side of the back skin thereof. In particular, a joining flange 31 is connected to the rear end of the first acoustic panel 1. The joining flange may, for example, be connected to the first acoustic panel 1 by various fixing structures, for example comprising a screw-nut system 41 and a blind screw-nut system 42.

A flange referred to as the engine flange 32 is formed at the front of the second acoustic panel 2. The connecting flange 31 is rigidly connected to the engine flange by connecting structure, for example bolts 43, distributed around the periphery of the flanges.

In order to close the acoustic panels, give them a certain shape and a certain mechanical strength, and also in order to allow for the attachment of the flanges, the respective ends of the acoustic panels generally have a wall behind which a volume is filled in during manufacture of the panel.

Thus, at its end, along one of its edges, the first panel has a first end wall 12 and a first solid zone 13. The second panel, at its end, along one of its edges, has a second end wall 22 and a second solid zone 23.

The end wall 12 is shaped in such a way as to allow the attachment of the joining flange, and notably as to allow the fitting of the screw-nut system 41. The result of this configuration is that the end of the first acoustic panel 1 is unable to absorb sound waves, over the length of the first end wall 12 and of the first solid zone 13. Likewise, the end of the second acoustic panel 2 is unable to absorb sound waves in the region of the second end wall 22 and of the second solid zone 23.

Thus, in the region of the junction between the first panel 1 and the second panel 2, the ends, which have no acoustic properties, of the panels combine to form a zone referred to as a non-acoustic zone Z.

An objective of the disclosure herein is to limit or even eliminate the non-acoustic zone at the junction between two acoustic panels.

SUMMARY

Thus, the disclosure herein relates to an assembly comprising a first acoustic panel and a second acoustic panel which are juxtaposed. A first edge of the first acoustic panel formed by a first end wall is joined to a second edge of the second acoustic panel formed by a second end wall. The first acoustic panel comprises a first resistive face and the second acoustic panel comprises a second resistive face. The first resistive face and the second resistive face are in the continuation of one another. The first edge is hollow. The first resistive face extends as far as the first end wall. The first end wall is in contact with the second end wall in the region of the first resistive face and of the second resistive face. A connecting piece is interposed between the first end wall and the second end wall over part of the respective length thereof, starting from a first back skin of the first acoustic panel and a second back skin of the second acoustic panel, so that the connecting piece does not extend as far as the first and second resistive faces.

Advantageously, the second edge is hollow and the second resistive face extends as far as the second end wall.

In the assembly thus formed, the resistive faces are not only in the continuation of one another but also juxtaposed with no non-acoustic zone between them other than the one formed by the thickness of the first and second end walls. Incidentally, the thickness of these walls is negligible compared with the other dimensions of the panels, which means that the assembly in practice forms a single continuous acoustic zone.

The connecting piece may comprise a first branch and a second branch which extends some distance away from the first and second resistive faces, so that of the first and second edges at least one comprises an end cavity formed between the first or the second resistive face and the second branch of the connecting piece.

The second branch may be parallel to the first and to the second resistive face.

The connecting piece may have a substantially L-shaped cross section.

Alternatively, the connecting piece may have a substantially T-shaped cross section.

The connecting piece may comprise a third branch. It may be parallel to the second branch.

Each acoustic panel may comprise a cellular structure comprising cells having substantially the same volume, and the first and second end walls may form volumes respectively in the first edge and the second edge, the volumes thus formed being greater than the volume of the cells.

The disclosure herein also relates to a soundproof cladding formed of one or more assemblies as described hereinabove. The disclosure herein also relates to a nacelle of an aircraft propulsion unit comprising such a cladding forming an internal surface of the nacelle. Finally, the disclosure herein relates to an aircraft comprising such a nacelle.

BRIEF DESCRIPTION OF THE DRAWINGS

Other specific features and advantages of the disclosure herein will become further apparent in the description below.

In the attached drawings, given by way of nonlimiting examples:

FIG. 7b depicts, in a similar view, an alternative form of the embodiment of FIG. 7a;

FIG. 9b depicts, in a similar view, an alternative form of the embodiment of FIG. 9a.

DETAILED DESCRIPTION

Figure 1A:
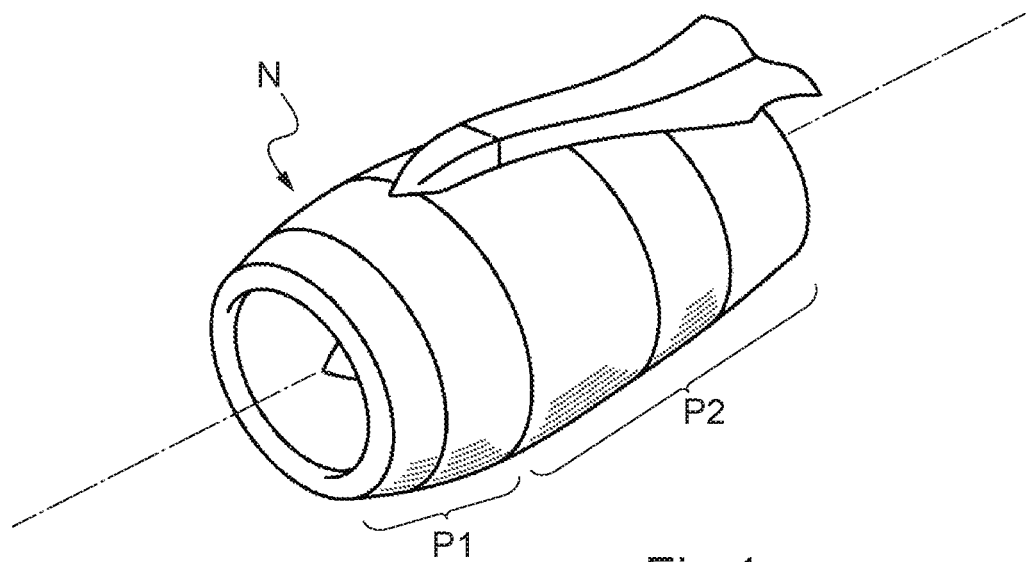
FIG. 1a depicts a three-dimensional schematic view of a nacelle of an aircraft propulsion assembly.
Figure 1B:
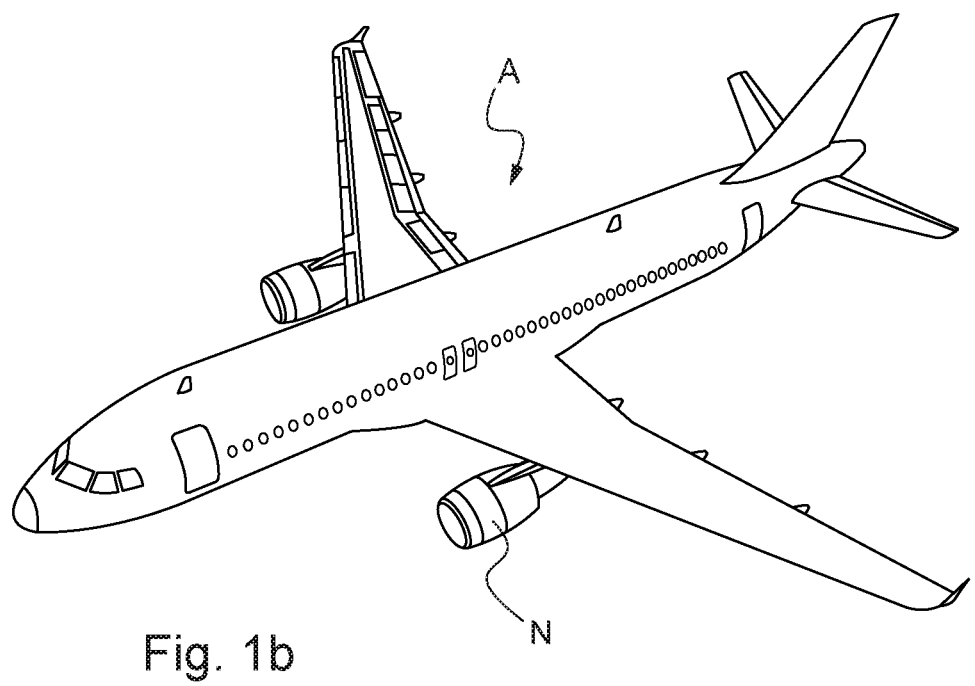
FIG. 1b depicts a three-dimensional schematic view of an aircraft.
Figure 2:
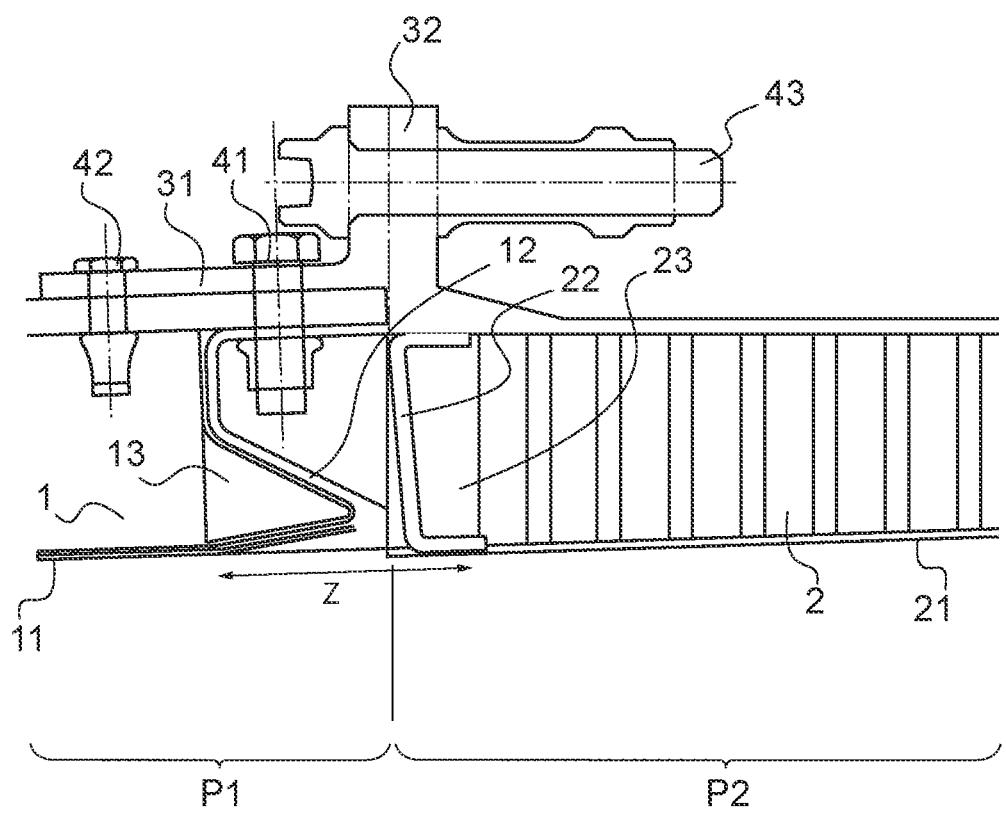
FIG. 2 depicts a cross-sectional part view of one example of a connection produced according to the prior art between an anterior part and a main part of a nacelle of an aircraft propulsion assembly.

FIGS. 1a, 1b and 2 respectively depicting a nacelle of an aircraft propulsion assembly and the connection between two constituent parts of such a nacelle in the region of acoustic panels that it comprises, have already been described hereinabove with reference to the prior art of the disclosure herein. Various known ways of achieving a junction between two acoustic panels are illustrated in FIGS. 3 to 6. Just like FIG. 2, FIGS. 3 to 6 are views in cross section on a plane of section that is both orthogonal to the first and second resistive faces 11, 21 of the first and second acoustic panels 1, 2 and orthogonal to a first edge 14 of the first panel and a second edge 24 of the second panel.

Figure 3:
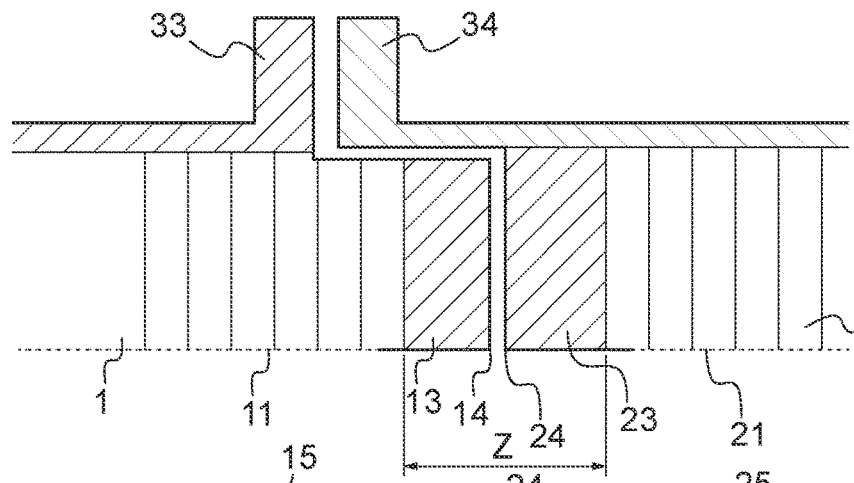
FIG. 3 depicts a cross-sectional diagram of a first example of a connection produced according to the prior art between a first acoustic panel and a second acoustic panel.

The schematic diagram depicted in FIG. 3 illustrates the connection between a first acoustic panel 1 and a second acoustic panel 2. According to this way of connection, just as in the example of FIG. 2, a first flange 33 (which may correspond to the joining flange 31) connected to the first acoustic panel 1 is fixed to a second flange 34 (which may correspond to the engine flange 32) connected to the second acoustic panel 2.

The first resistive surface 11 of the first acoustic panel and the second resistive surface 21 of the second acoustic panel extend in the same plane. They are thus in the continuation of one another. The first and second resistive faces are perforated (or at least porous) so as to place the internal structure of the acoustic panels in communication with the external medium surrounding the panels.

The first acoustic panel 1 at its end comprises a first solid zone 13, which forms the first edge 14 of the first panel. The second acoustic panel at its end comprises a second solid zone 23 which forms the second edge 24 of the second panel. The juxtaposition of the first solid zone 13 and of the second solid zone 23 thus creates a substantial non-acoustic zone Z between the first resistive face 11 and the second resistive face 21.

According to other known ways of connecting a first acoustic panel 1 to a second acoustic panel 2, a connecting piece 5 is interposed between the first edge 14 of the first acoustic panel 1 and the second edge 24 of the second acoustic panel 2.

Figure 4:
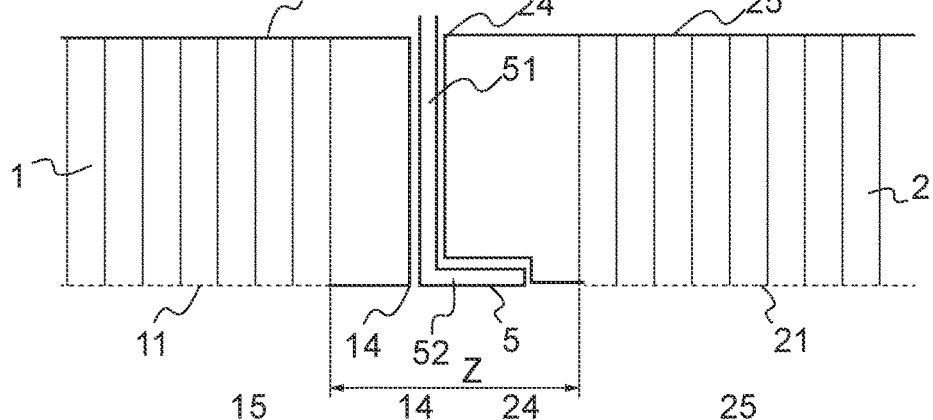
FIG. 4 depicts a cross-sectional diagram of a second example of a connection produced according to the prior art between a first acoustic panel and a second acoustic panel.
Figure 5:
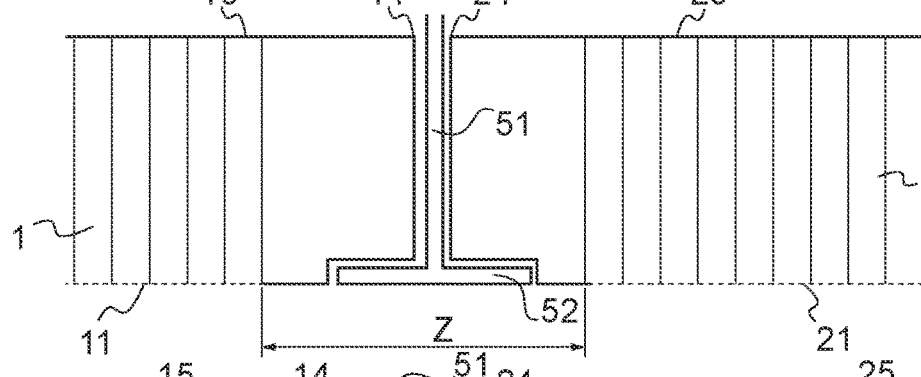
FIG. 5 depicts a cross-sectional diagram of a third example of a connection produced according to the prior art between a first acoustic panel and a second acoustic panel.
Figure 6:
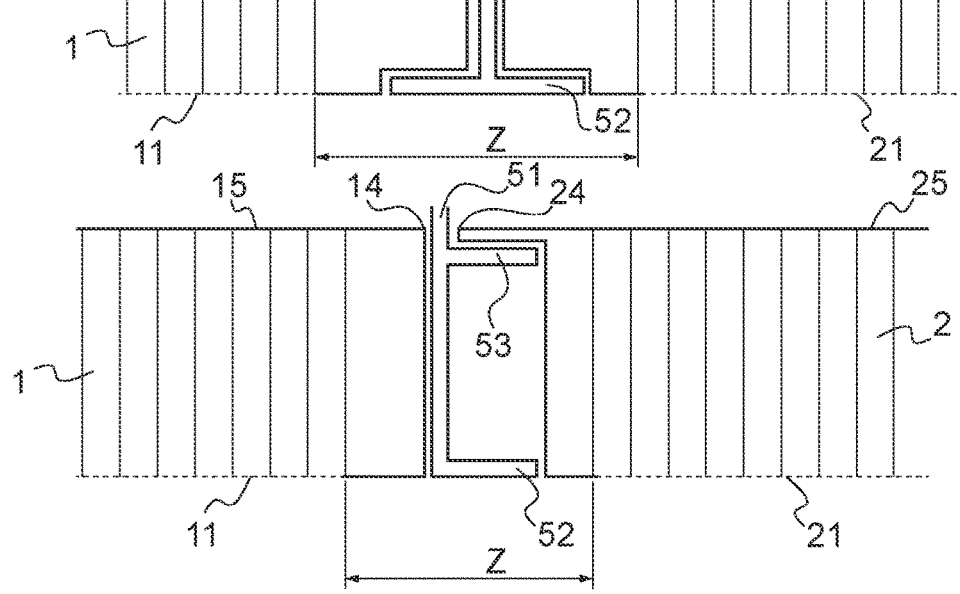
FIG. 6 depicts a cross-sectional diagram of a fourth example of a connection produced according to the prior art between a first acoustic panel and a second acoustic panel.

FIGS. 4 to 6 depict various connections between a first acoustic panel 1 and a second acoustic panel 2, these connections being achieved according to embodiments known from the prior art involving a connecting piece 5.

The connecting pieces 5 may have various cross sections schematically indicated in FIGS. 4 to 6 so as to allow the connection between the first acoustic panel 1 and the second acoustic panel 2. In the example of FIG. 4, the connecting piece 5 has a substantially L-shaped cross section. The horizontal branch of the L extends in the plane of the first and second resistive faces 11, 21. In the example of FIG. 5, the connecting piece 5 has a substantially T-shaped cross section. The horizontal branch of the T extends in the plane of the first and second resistive faces 11, 21. In the example of FIG. 6, the connecting piece 5 has a cross section with three branches, namely a first branch 51 perpendicular to the first and second resistive faces 11, 21, a second branch 52 and a third branch 53 which are parallel to the first and second resistive faces 11, 21.

The various connecting pieces 5 known from the prior art have in common the fact that they extend from a first back skin 15 of the first acoustic panel 1 as far as the first resistive face 11 and, correspondingly, from a second back skin 25 of the second acoustic panel 2 as far as the second resistive face (which incidentally also corresponds to the plane of extension of the first resistive face 11). The various connecting pieces 5 known from the prior art also have in common the fact that in cross section they comprise a first branch 51 perpendicular to the first and second resistive faces 11, 21, and a second branch 52 which extends in the plane of the first and second resistive faces 11, 21.

Thus, the area over which the second branch 52 extends is a zone, which has no acoustic property, situated between the first acoustic panel 1 and the second acoustic panel 2. The non-acoustic zone Z may be made up of this surface and, where applicable, be enlarged by the solid or hollow zones situated in the first and second acoustic panels 1, 2 near the first edge 14 and near the second edge 24.

FIGS. 7a to 9b depict, in schematic cross-sectional diagrams similar to those of FIGS. 3 to 6, non-exhaustive examples of ways of embodying the disclosure herein.

Thus, a first acoustic panel 1 is juxtaposed with a second acoustic panel 2.

In particular, in order to form an assembly constituting an extensive acoustic surface area, the first edge 14 of the first acoustic panel 1 is joined to the second edge 24 of the second acoustic panel 2. The first edge 14 is formed by a first end wall 12. Similarly, the second edge 24 is formed by a second end wall 22.

In the disclosure herein, the first edge 14 is hollow, at least in the vicinity of the plane of extension of the first and second resistive faces 11, 21. In the exemplary embodiments illustrated, the second edge is also hollow, at least in the vicinity of the plane of extension of the first and second resistive faces 11, 21.

The first resistive face 11 extends as far as the first end wall 12. In particular, perforations are thus formed as far as the first end wall 12. The perforations in the first resistive face 11 which are situated in the vicinity of the first end wall 12 thus open into an end cavity 16 situated in the first hollow edge.

Likewise, the second resistive face 21 extends as far as the second end wall 22. The perforations in the second resistive face 21 which are situated in the vicinity of the first end wall 12 thus open into an end cavity 16 situated in the first hollow edge.

Thus, the first acoustic panel 1 and the second acoustic panel have an acoustic effect of absorbing sound waves right up to their respective end wall.

The first end wall 12 is in contact with the second end wall in the region of the first resistive face and of the second resistive face, namely in the region of the plane of extension of the first and second resistive faces 11, 21. Thus, the first resistive face 11 and the second resistive face 21 form a near-uninterrupted resistive surface.

Figure 7A:
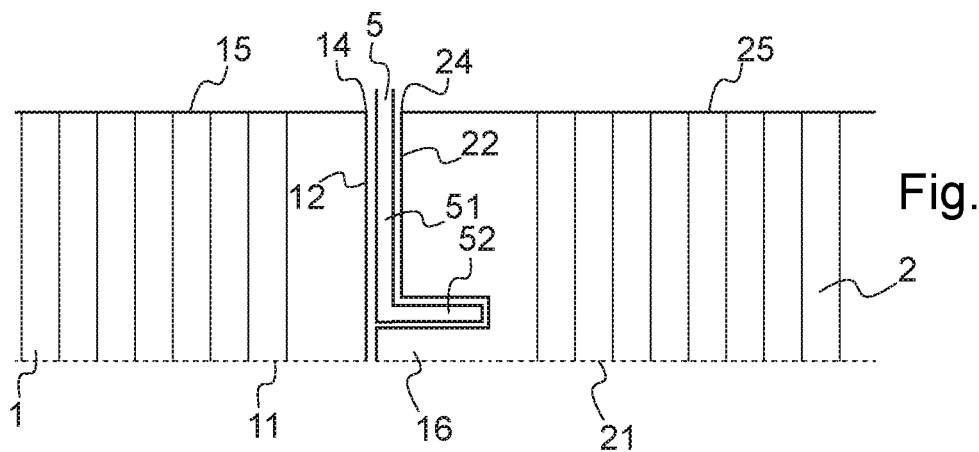
FIG. 7a depicts a cross-sectional diagram of a connection produced according to a first embodiment of the disclosure herein between a first acoustic panel and a second acoustic panel.
Figure 7B:
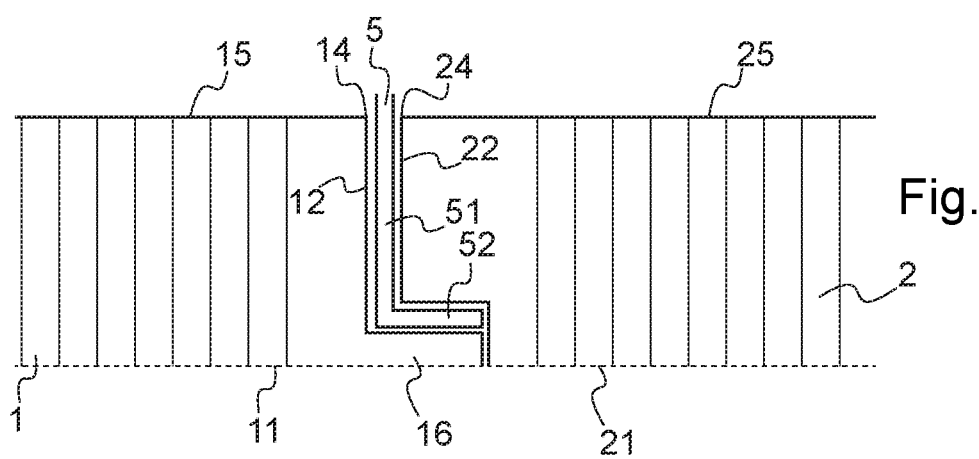
Figure 7C:
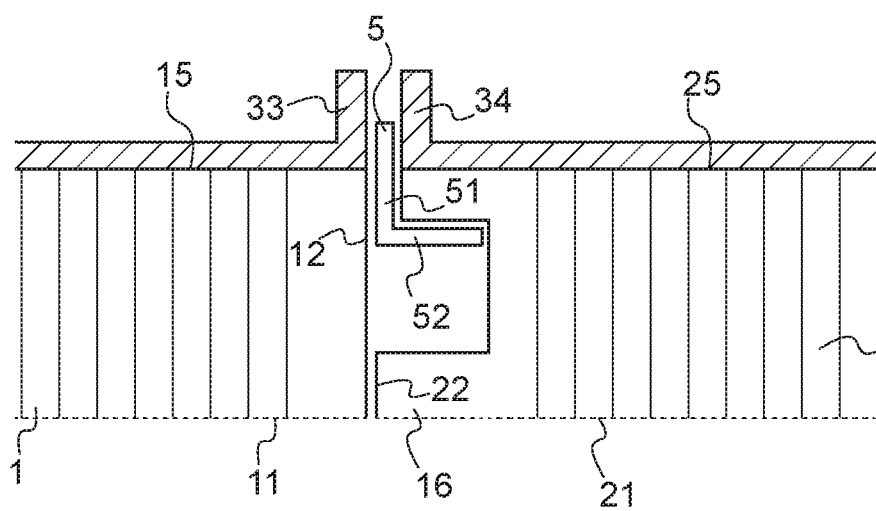
FIG. 7c depicts, in a similar view, an alternative form of the embodiment of FIGS. 7a and 7b.
Figure 8:
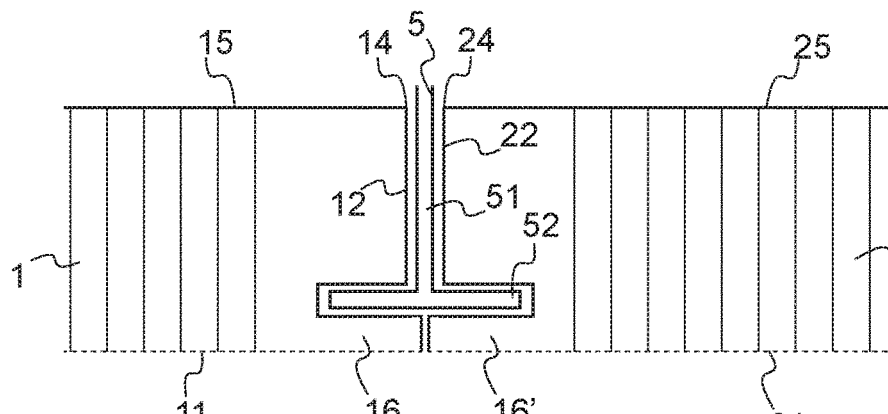
FIG. 8 depicts a cross-sectional diagram of a connection produced according to a second embodiment of the disclosure herein between a first acoustic panel and a second acoustic panel.

The example ways of embodying the disclosure herein which are depicted in FIGS. 7 to 9 employ a connecting piece 5 which is interposed between the first end wall 12 and the second end wall 22.

Unlike the connecting pieces known from the prior art, the connecting pieces 5 employed are interposed between the first end wall 12 and the second end wall 22 only over part of the respective length thereof. Thus, the connecting piece of the embodiments of FIGS. 7 to 9 extends from the first back skin 15 of the first acoustic panel 1 and from the second back skin 25 of the second acoustic panel 2, but does not extend as far as the first and second resistive faces.

The connecting pieces depicted in FIGS. 7a to 9b have a configuration analogous to those of the connecting pieces employed in FIGS. 4 to 6 respectively. In particular, the connecting piece 5 of the embodiment of FIGS. 7a, 7b and 7c has a substantially L-shaped cross section. The connecting piece 5 of the embodiment of FIG. 8 has a substantially T-shaped cross section. The connecting piece 5 of the embodiment of FIGS. 9a and 9b has a cross section with three branches, namely a first branch 51 perpendicular to the first and second resistive faces 11, 21, a second branch 52 and a third branch 53 which are parallel to the first and second resistive faces 11, 21.

In the embodiment of FIGS. 7a to 9b, the second branch 52 of the connecting piece 5 thus extends parallel to and some distance away from the resistive faces 11, 21.

In so far as the end walls 12, 22 are in contact with one another in the region of the resistive faces 11, 21, an end cavity 16 is formed between the first resistive face 11 and the second branch 52 of the connecting piece and/or between the second resistive face 21 and the second branch 52 of the connecting piece.

Figure 9A:
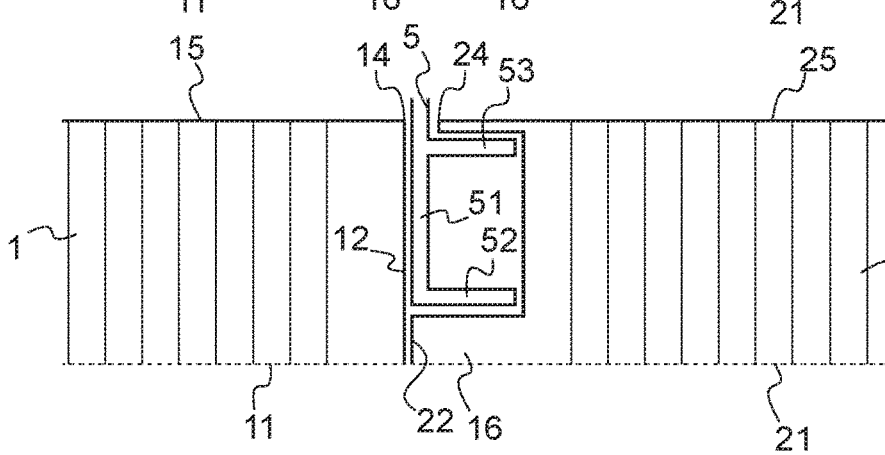
FIG. 9a depicts a cross-sectional diagram of a connection produced according to a third embodiment of the disclosure herein between a first acoustic panel and a second acoustic panel.

In particular, in the example of FIGS. 7a, 7c and 9a, an end cavity 16 is formed between the second resistive face 21 and the second branch 52 of the connecting piece.

Figure 9B:
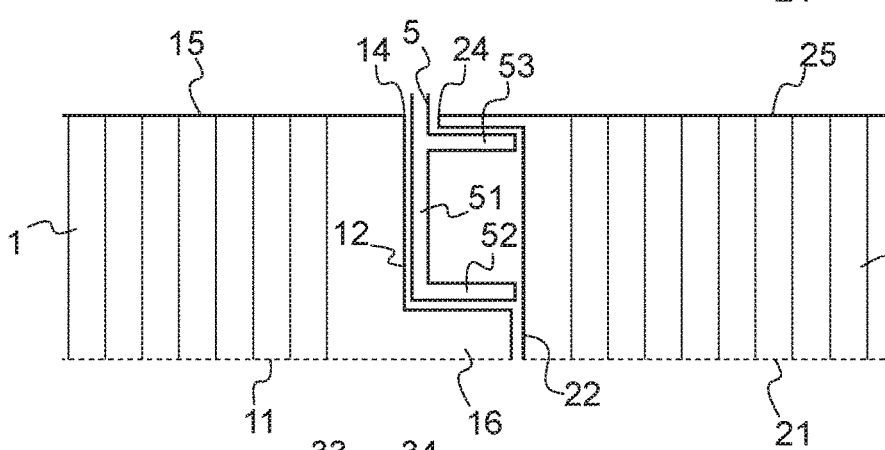

In particular, in the example of FIGS. 7b and 9b, an end cavity 16 is formed between the first resistive face 11 and the second branch 52 of the connecting piece. In the example of FIG. 8, an end cavity 16 is formed between the first resistive face 11 and the second branch 52 of the connecting piece and another end cavity 16' is formed between the second resistive face 21 and the second branch 52 of the connecting piece.

FIG. 7c depicts an alternative form of the connection of FIG. 7a, in which the L-shaped connecting piece 5 rests against the top part of the second acoustic panel 2. This alternative form makes it possible to create a gripping of the second acoustic panel between the connecting piece 5 and the second flange 34 (which may correspond to the engine flange 32) and to make it easier to fix the connecting piece 5 to the second flange 34. A similar adaptation can be made to the embodiments of FIGS. 7b and 8.

The first and second acoustic panels 1, 2 thus exhibit acoustic properties (the ability to absorb sound waves) all the way to their ends which are in contact with one another in the region of their resistive face, namely in their plane of extension, thus in practice forming a continuous acoustic surface.

Figure 10:
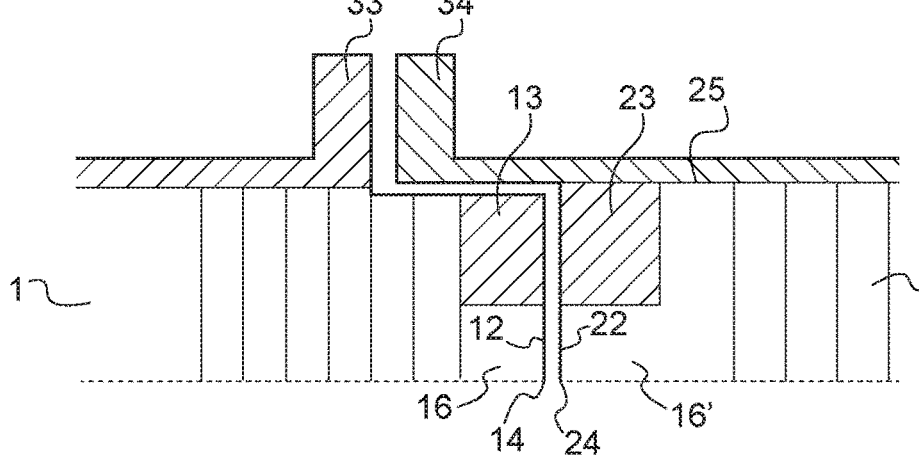
FIG. 10 depicts a cross-sectional diagram of a connection produced between a first acoustic panel and a second acoustic panel.

The connection depicted in FIG. 10 corresponds to an optimization of the connection between two acoustic panels according to the prior art which is depicted in FIG. 3.

In particular, an end cavity 16 is formed in the first acoustic panel 1 between the first solid zone 13 and the first resistive face 11, thus making the first edge 14 hollow. Another end cavity 16' is formed, in the example depicted, in the first acoustic panel 1 between the second solid zone 23 and the second resistive face 21, thus rendering the second edge 24 hollow. In particular, in the prior art, the ends of the acoustic panels were filled in essentially to make them easier to manufacture. This filling effectively in particular allows the back skin 25 to be mounted more easily. The proposal in the connection illustrated in FIG. 10 is for only the top part of the end of the acoustic panel to be filled in, so as to create the end cavity 16, while at the same time maintaining the ease of placement of the back skin. This feature can be applied to the various embodiments of the disclosure herein, particularly those depicted in FIGS. 7a to 9b. Such a configuration thus makes it possible to eliminate the non-acoustic zone in the region of the connection between the first panel and the second panel, while at the same time maintaining the function afforded by the filled-in zone in the prior art.

In all the embodiments of the disclosure herein, the volumes formed in the hollow edges of the first acoustic panel and of the second acoustic panel respectively may be adapted to suit the frequencies of the sound waves that are to be absorbed. In particular, they may be dimensioned to absorb sound waves in the same frequency ranges as the rest of the acoustic panels. On the other hand, these volumes can be sized to be effective in other frequency ranges, for example for lower frequencies. That can be achieved by adopting cavity volumes greater than the volume of the cells of the acoustic panels.

Finally, the disclosure herein has been illustrated by cross sections through the acoustic panels. It applies to flat panels that can also be applied to the joining of curved panels. This is notably the situation in an aircraft propulsion unit nacelle which has an internal surface exhibiting one or more annular acoustic absorption zones.

The disclosure herein thus developed allows junctions between acoustic panels that limit or eliminate the non-acoustic zone (zone devoid of sound wave-absorption properties) between the acoustic panels. It makes it possible to form an acoustic cladding by joining several acoustic panels, the cladding thus formed behaving substantially like a single and continuous acoustic panel. The disclosure herein can be applied to numerous technical fields, notably in aeronautics. It is notably applicable to numerous parts of an aircraft which are subjected to sound waves that need to be deadened for the sake of passenger comfort and in order to limit the noise emissions of the aircraft.

One preferred application of the disclosure herein is the construction of an acoustic cladding inside an aircraft propulsion unit nacelle.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:
   a first acoustic panel and a second acoustic panel which are juxtaposed, a first edge of the first acoustic panel, formed by a first end wall, being joined to a second edge of the second acoustic panel, formed by a second end wall;
   the first acoustic panel comprising a first resistive face, which comprises perforations, and the second acoustic panel comprising a second resistive face, the first resistive face and the second resistive face being in continuation of one another;
   wherein, with the first edge being hollow, the first resistive face extends as far as the first end wall;
   wherein the first end wall is in contact with the second end wall in the region of the first resistive face and of the second resistive face;
   wherein the perforations in the first resistive face are situated in a vicinity of the first end wall and open into an end cavity situated in the hollow first edge; and
   wherein a connecting piece is interposed between the first end wall and the second end wall over a part of the respective length thereof from a first back skin of the first acoustic panel and a second back skin of the second acoustic panel, so that the connecting piece does not extend as far as the first and second resistive faces.

2. The assembly according to claim 1, wherein the second edge is hollow and the second resistive face extends as far as the second end wall.

3. The assembly according to claim 1, wherein the connecting piece comprises a first branch and a second branch which extends a distance away from the first and second resistive faces,
   so that of the first and second edges at least one comprises an end cavity formed between the first or the second resistive face and the second branch of the connecting piece.

4. The assembly according to claim 3, wherein the connecting piece has a substantially L-shaped or a substantially T-shaped cross section.

5. The assembly according to claim 3, wherein the connecting piece comprises a third branch.

6. The assembly according to claim 1, wherein each acoustic panel comprises a cellular structure comprising cells having substantially a same volume, and wherein the first and second end walls form volumes respectively in the first edge and the second edge, the volumes thus formed being greater than a volume of the cells.

7. A soundproof cladding formed of one or more assembly according to claim 1.

8. A nacelle of an aircraft propulsion unit comprising:
   soundproof cladding forming an internal surface of the nacelle, the cladding formed of one or more assembly, each assembly comprising:
   a first acoustic panel and a second acoustic panel which are juxtaposed, a first edge of the first acoustic panel, formed by a first end wall, being joined to a second edge of the second acoustic panel, formed by a second end wall;
   the first acoustic panel comprising a first resistive face, which comprises perforations, and the second acoustic panel comprising a second resistive face, the first resistive face and the second resistive face being in continuation of one another;

wherein, with the first edge being hollow, the first resistive face extends as far as the first end wall;

wherein the first end wall is in contact with the second end wall in the region of the first resistive face and of the second resistive face;

wherein the perforations in the first resistive face are situated in a vicinity of the first end wall and open into an end cavity situated in the hollow first edge; and wherein a connecting piece is interposed between the first end wall and the second end wall over a part of the respective length thereof from a first back skin of the first acoustic panel and a second back skin of the second acoustic panel, so that the connecting piece does not extend as far as the first and second resistive faces.

9. An aircraft comprising the nacelle according to claim 8.

* * * * *